April 18, 1961     B. BETHEA     2,980,378
DEAD END CABLE CLAMP
Filed Nov. 23, 1959
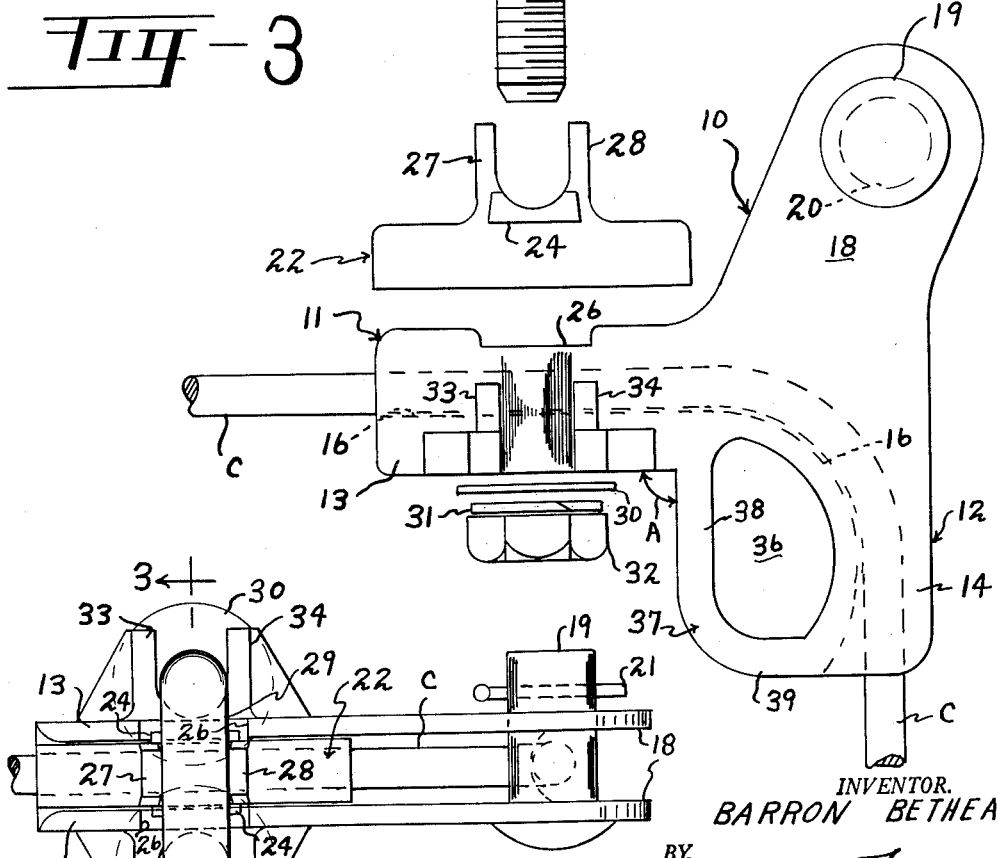
INVENTOR.
BARRON BETHEA
BY Jennings, Carter & Thompson
ATTORNEYS

United States Patent Office

2,980,378
Patented Apr. 18, 1961

2,980,378

DEAD END CABLE CLAMP

Barron Bethea, 1625 Carolina Ave., Bessemer, Ala.

Filed Nov. 23, 1959, Ser. No. 854,844

3 Claims. (Cl. 248—63)

This invention relates to a cable clamp and more particularly to the type of clamp known as a dead end cable clamp.

The present invention comprises a dead end cable clamp in which the body of the clamp has two body portions that are arranged in right angular relation to each other with the longitudinal axis of the cable in the clamp being at right angles and with the axis of one portion of the cable in alignment with the pin connecting the clamp to a fixed support.

A keeper and U-bolt are on one of the body portions and the U-bolt is also in parallel relation to the axis of the tensioned cable portion. Upon pull being exerted on the tensioned end of cable C when the U-bolt is tightened on the keeper, the keeper shifts slightly in the direction of the tensioned cable and results in an increased pressure on the cable by the keeper to provide a locking action. Both the keeper and the body of the clamp have straight V-shaped grooves with the bottom of the grooves having a slight radius and the pressure exerted by the keeper on the cable when the cable is pulled tends to flatten the cable to provide a sufficient contact area with the cable. The keeper has projections extending laterally therefrom to provide an increased bearing area for the U-bolt and to aid in preventing the shearing of the U-bolt at the keeper.

It is an object of the present invention to provide a dead end clamp in which the clamp body comprises two body portions arranged in a right angular relation to each other with a cable therein arranged in a right angular relation with a portion of the cable being in alignment with a pin connecting the clamp to a fixed support.

A further object of my invention is to provide a dead end clamp to withstand high pressure in which a keeper shifts slightly in the direction of the tensioned cable to provide a locking action on the cable which is seated in a straight V-shaped groove with the keeper having an increased bearing area for the U-bolt.

An additional object is to provide a dead end clamp having a keeper with projections extending outwardly therefrom fitting in notches on the sides of one of the body portions so that the U-bolt may have a relatively large bearing surface on the keeper when it is clamped tightly against the cable to aid in preventing shearing of the U-bolt.

These and other features are illustrated in the accompanying drawing, forming a part of this application, in which:

Fig. 1 is an exploded side elevational view of my dead end cable clamp;

Fig. 2 is a top plan view of the clamp shown in Fig. 1 with the several parts assembled; and, Fig. 3 is a sectional view taken generally along the line 3—3 of Fig. 2.

Referring now to the drawing, I show my dead end cable clamp comprising a body indicated generally by the numeral 10 having a body portion 11 and a body portion 12 arranged at right angles to each other. Body portion 11 has spaced parallel sides 13 and body portion 12 has spaced parallel sides 14 to form with body portions 11 and 12 a V-shaped cable groove between the parallel sides as indicated by the numeral 16. A cable C is shown positioned within groove 16.

Body portions 11 and 12 intersect at an extension 18 having parallel spaced sides. A pin 19 extends between the sides of extension 18 and is adapted to secure the cable clamp to a fixed support (not shown). A cotter pin 21 keeps pin 19 from slipping from openings 20 formed in extension 18 to receive pin 19. The longitudinal axis of the tensioned end of cable C in body portion 12 intersects the center line of pin 19 so that any pull exerted on the cable acts through pin 19.

A keeper is indicated generally by the numeral 22 and is of a size to fit between sides 13 of body portion 11. Keeper 22 has a V-shaped straight cable groove 23 on the underside thereof adapted to contact a cable C in cable groove 16. Cable groove 23 has a slight radius at the bottom of the groove. A laterally extending projection 24 extends outwardly from each side of keeper 22 and a notch 26 is provided in each of sides 13 to receive projection 24 when cable C is in secured position within groove 16. Projections 24 do not contact notches 26 even when the cable is pulled taut. The cable C in body portion 11 is non-tensioned while the portion of cable C in body portion 12 is tensioned.

A pair of ears 27 and 28 extend upwardly from keeper 22 and receive a threaded U-bolt 29. Washers 30 engage the under surface of body portion 11 and split lock washers 31 engage washers 30. Nuts 32 are in threaded engagement with U-bolt 29 and bear against lock washers 31 to secure U-bolt 29 and keeper 22 on body portion 11. Guides or lugs 33 and 34 extend outwardly from each side of body portion 11 and nuts 32 are supported by the underside of lugs 33 and 34. U-bolt 29 is received therebetween to position properly U-bolt 29 on body portion 11. Extensions 24 provide an increased bearing area for U-bolt 29 on keeper 22 and thereby aid in preventing shearing of the U-bolt thereat.

A pulling eye 36 is formed by an elongated right-angled member 37 having a portion 38 thereof in generally parallel relation to U-bolt 29 and to the tensioned cable in body portion 12. A portion 39 of member 37 may be positioned in a right-angled position to portion 38. Angle A between portion 38 and body portion 11 is shown as 90° which places U-bolt 29 in parallel relation to member 38. By having angle A of 90° or larger, workmen with tools may easily adjust nuts 32 without undue interference from the pulling eye. The threads on U-bolt 29 may be waxed, if desired, to allow the nuts to be more easily tightened and to protect the threads from foreign matter.

From the foregoing, it will be understood that I have provided a dead end cable clamp in which the body of the clamp has two body portions that are arranged in right angular relation to each other with a cable clamped therein and having cable portions in the clamp arranged at right angles. The longitudinal axis of the tensioned end of cable C intersects the centerline of the pin securing the clamp to a fixed support. Upon pull being exerted in the tensioned end of cable C when the waxed U-bolt 29 is tightened on the keeper which is positioned in contact with cable C in the straight cable groove, keeper 22 is pulled slightly in the direction of the tensioned cable end. The slight shifting of the keeper upon pull being exerted on the tensioned cable end results in an increased pressure on the cable by the keeper thus providing a locking action. Thus a clamp is provided which is sufficiently strong to withstand high pressure exerted by a waxed U-bolt which pressure tends to flatten the cable and thereby provide a sufficient contact area on the cable. A pulling eye is formed between the intersection of the body portions and does not interfere with the tightening of the U-bolt.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In a cable clamp, a body having a pair of body portions in right angular relation to each other, said body portions having a continuous cable groove therein with the cable groove in one body portion positioned in substantially a right angular relation to the cable groove in the other body portion, a pair of substantially parallel spaced sides extending from each of the body portions and intersecting at the juncture of the body portions, an extension extending from the intersection of the parallel sides and comprising two parallel side portions, a pin extending through said side portions and adapted to be secured to a fixed support for supporting the cable clamp, an elongated member extending between the outer surface of the body portions on a side of the body portions opposite the extension thereby to form a pulling eye, a keeper being of a size to fit between the parallel sides of one of the body portions and pressing against a cable therein having cable portions in right angled relation to each other with the longitudinal axis of one cable portion being in alignment with said pin, a U-bolt fitting over the keeper and extending therefrom over the parallel sides of said one body portion, guides on the parallel sides adjacent the keeper to receive the ends of the U-bolt, and nuts on the ends of the U-bolt to draw the keeper into engagement with the cable in the cable groove.

2. In a cable clamp, a body having a pair of body portions in right angular relation to each other, said body portions having a continuous cable groove therein with the cable groove in one body portion positioned in substantially a right angular relation to the cable groove in the other body portion, a pair of substantially parallel spaced sides extending from each of the body portions and intersecting at the juncture of the body portions, an extension extending from the intersection of the parallel sides and comprising two parallel side portions, a pin extending through said side portions and adapted to be secured to a fixed support for supporting the cable clamp, a keeper being of a size to fit between the parallel sides of one of the body portions and pressing against a cable therein having cable portions in right angled relation to each other with the longitudinal axis of one cable portion being in alignment with said pin, a projection extending outwardly from each side of the keeper, a notch in each of the parallel sides of said one body portion to receive the projections, a U-bolt fitting over the keeper and extending therefrom over the parallel sides of said one body portion and seating in said projections, guides on the parallel sides of said one body portion adjacent the keeper to receive the ends of the U-bolt, and nuts on the ends of the U-bolt to draw the keeper in engagement with the cable in the cable groove.

3. The cable clamp defined in claim 2 characterized in that said keeper has a V-shaped cable groove therein, and said cable groove in the body portions is V-shaped to receive the cable therein.

References Cited in the file of this patent

UNITED STATES PATENTS

| 2,139,415 | McLachlar | Dec. 6, 1938 |
| 2,670,164 | Gill | Feb. 23, 1954 |